T. H. JONES.
BRAIDING MACHINE.
APPLICATION FILED APR. 2, 1913.

1,084,442.

Patented Jan. 13, 1914.

2 SHEETS—SHEET 1.

Witnesses:
Geo. B. Pitts
L. C. Brady

Inventor:
Thomas Henry Jones
By John S. Barker
his atty.

T. H. JONES.
BRAIDING MACHINE.
APPLICATION FILED APR. 2, 1913.
1,084,442.
Patented Jan. 13, 1914.
2 SHEETS—SHEET 2.
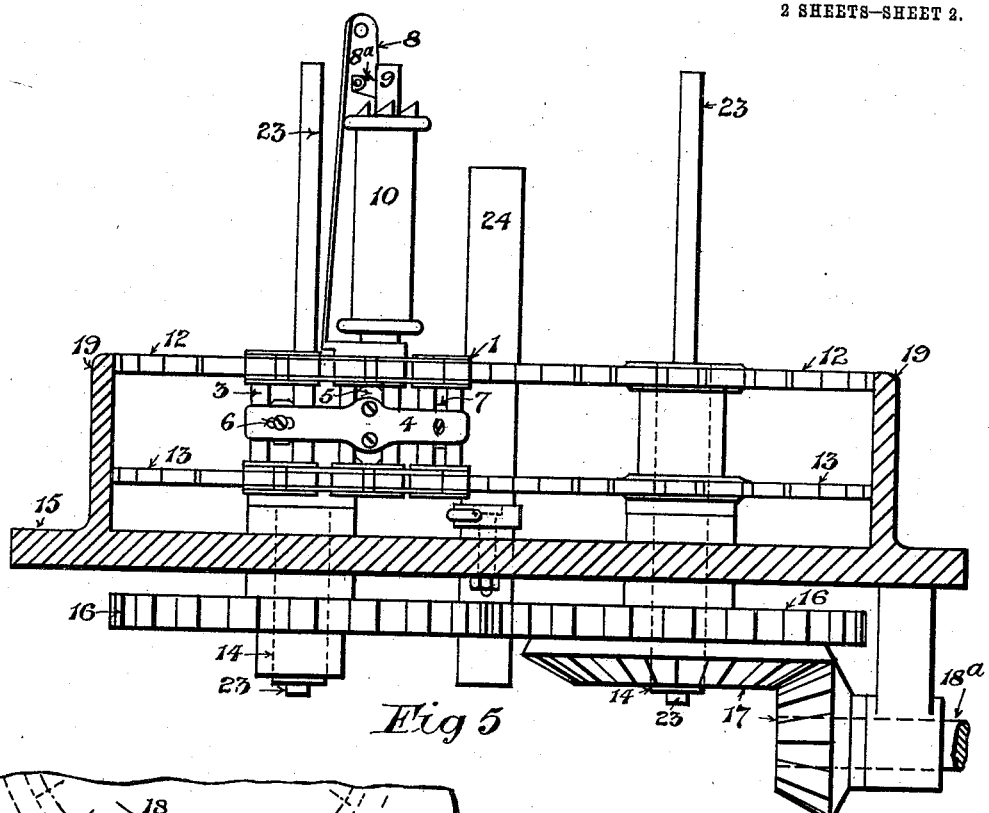
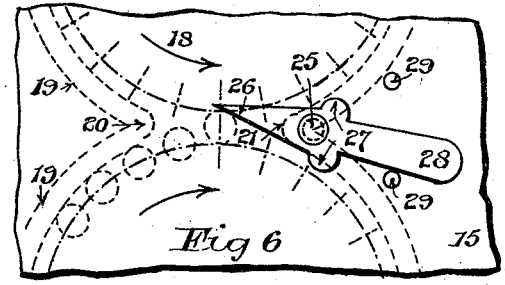
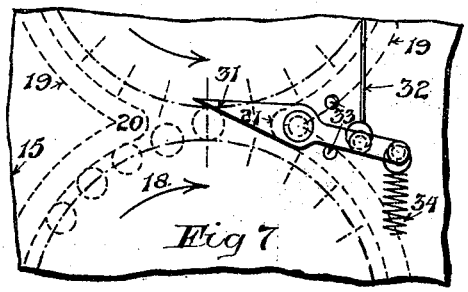
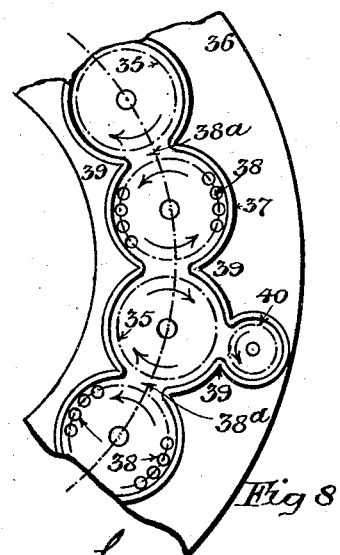

UNITED STATES PATENT OFFICE.

THOMAS HENRY JONES, OF NOTTINGHAM, ENGLAND.

BRAIDING-MACHINE.

1,084,442. Specification of Letters Patent. Patented Jan. 13, 1914.

Application filed April 2, 1913. Serial No. 758,336.

*To all whom it may concern:*

Be it known that I, THOMAS HENRY JONES, a subject of the King of Great Britain, and resident of the city of Nottingham, in the county of the said city, England, have invented new and useful Improvements in Braiding-Machines, of which the following is a specification.

This invention relates to improvements in braiding machines of the kind used for the manufacture of plain and fancy braids, lace fabrics, braided cores, and for other similar purposes, and has particular reference to improvements in and applicable to flexible carriers for carrying the spindles upon which the spools are mounted; the object of the present invention being the production of a flexible spring carrier so arranged that it tends to hold itself in a straight line, or in a circular curve of the same radius as the driver, and which, in conjunction with fixed guides, at the carrier passing places either automatically transfers itself from one driver to another or automatically remains on its own driver. The invention also consists of the combination with the improved carrier of suitable mechanism by which the automatic action of the carrier at the passing places can be controlled, and further, in improvements in the general construction and arrangement of the spindle actuating mechanism.

Figure 1:
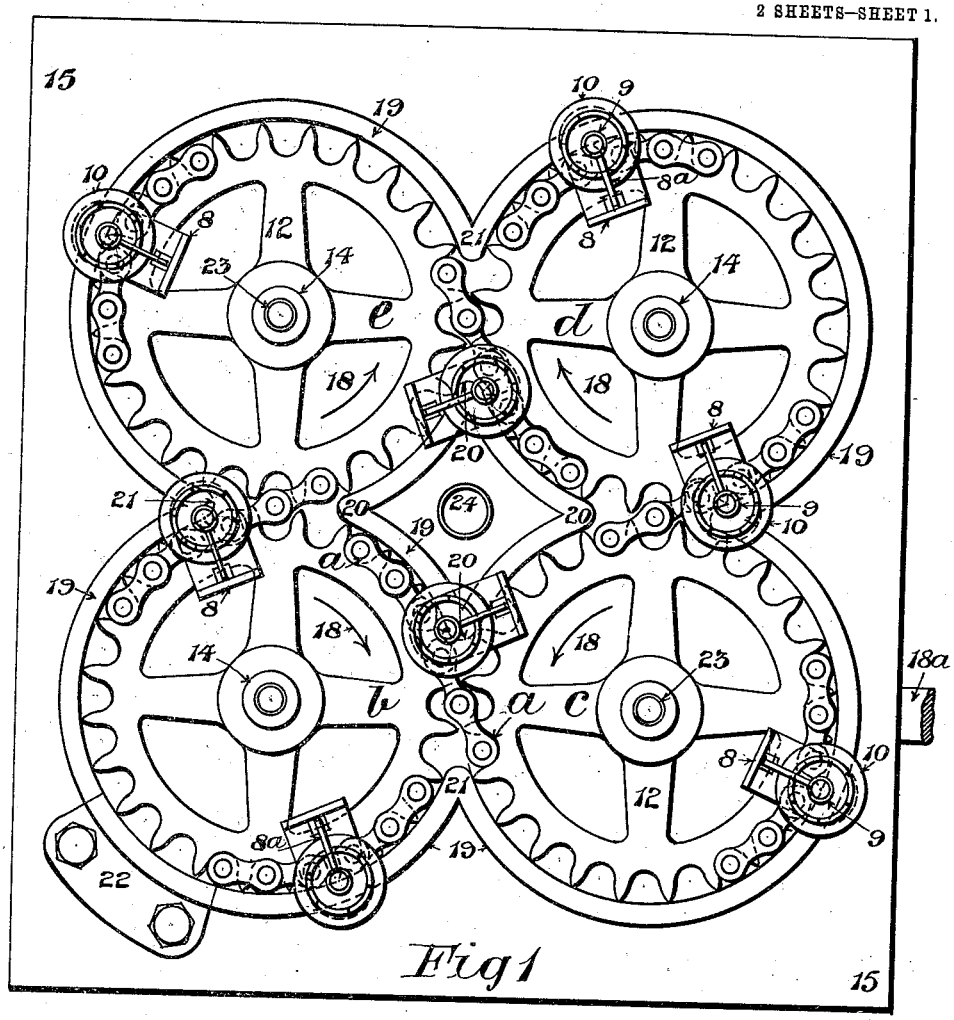
Figure 2:
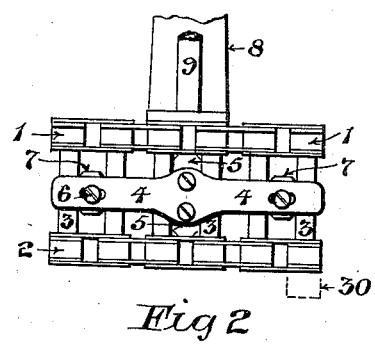
Figure 3:
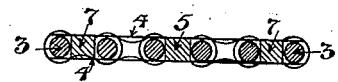
Figure 4:

In the drawings Figure 1. is a plan of the drivers and carriers as arranged for an eight spindle braiding machine. Fig. 2. is an elevation of a flexible spring chain carrier. Fig. 3. is a section of a spring chain carrier arranged to hold itself in a straight line. Fig. 4. is a section of a spring chain carrier arranged to hold itself in a circular arc. Fig. 5. is an elevation of part of the mechanism shown in Fig. 1. Fig. 6. is the plan of a switch, the position of which is controlled by the carrier. Fig. 7. is the plan of a switch, the position of which is controlled by pattern mechanism, and Fig. 8. is a diagram illustrating the application of this invention to a multiple spindle circular braiding machine.

The drawings illustrate a machine designed for use with chain carriers of the kind shown in Figs. 2, 3 and 5. These carriers are built up of a top chain 1 and a bottom chain 2, and the two chains are connected together by spacing studs 3, the joints of the carriers being sufficiently loose to allow of the length of the carrier varying as is required when it passes from one driver to another. At the sides of the studs 3 there are straight flat springs 4, which are attached to a loose center block 5, and at their ends connected by slot and screw 6 to other loose blocks 7 to allow of the carrier and spring being bent to the circle of the driver. The top chain 1 is fitted with the spindle bracket 8, which may form one of the upper links, and carries the tube 9 for the spool 10, Fig. 5. The tube 9 is provided with a thread tension spring and weight, and the bracket 8 carries the ratchet let-off lever $8^a$, both these parts being constructed and arranged according to the usual method. In the modification shown in Fig. 4, the studs 3 are drilled or slotted to carry one or more springs 11, which are headed to prevent them slipping through the holes in the studs. They may be bent to hold the carrier in the same curve as the driver, or they may be straight. The springs shown in Figs. 2 and 3 may also be curved if desired.

The drivers for use in connection with the chain carriers are built up of upper toothed wheels 12 and lower toothed wheels 13 for engaging with the chains 1 and 2 respectively. Both the wheels 12 and 13 are fixed upon axles 14 which have bearings in the base plate 15, and below such base plates the axles are geared together by toothed gear wheels 16, driven by the bevel toothed gear wheels 17 from a shaft $18^a$ which is fitted with fast and loose pulleys, the drivers thus geared together revolving in the directions of the arrows 18. Surrounding the drivers there is a fixed rim 19 by which the carriers are held in position on the drivers and these rims are cut away between the points 20 and 21 to form carrier passing places, the distance between the two points being less than the length of a carrier, so that when a carrier passes from one driver to another its front end is controlled by the rim surrounding one driver before the back end is beyond the control of the rim surrounding the driver from which the carrier is passing. One or more parts of the rim 19 is fitted with a loose piece 22 to allow of the carriers being readily introduced to and removed from the drivers. The driver spindles are fitted with tubes 23 to allow of cores or other threads being introduced, and there is also another tube 24 for the introduction of a central core.

The machine shown in Fig. 1 is fitted with straight carriers of the type shown in Fig. 3, and these carriers, when passing between the points 21, are bent to the circle of the drivers by means of the rim 19 and are carried around with such drivers. When however the forward end of a carrier $a$, Fig. 1, reaches a passing place between the points 20 and 21 the springs 4 come into action and move the forward end of the carrier into a line which is tangent to the circle of the driver $b$ and this movement of the forward end of the carrier is continued until the end of the carrier is moved into engagement with the teeth of an adjacent driver $c$. The carrier $a$ is then brought under the influence of the rim surrounding the driver $c$ and is bent around such driver. At the next passing place the carrier automatically passes to the driver $d$ and thence to the driver $e$, and after being carried around this driver passes to the driver $b$ and repeats its cycle of movements. In the same manner all the other carriers automatically transfer themselves from one driver to an adjacent driver at each passing place.

The mechanism shown in Fig. 1 is designed to produce an ordinary plain braid or braided core, but when fancy or patterned effects are required the machine is fitted with switch mechanism of the type shown in Figs. 6 and 7, designed to control the automatic action of the carriers at the passing places. The switch shown in Fig. 6 is pivotally mounted at 25 and may be provided with a friction clip for holding the switch point 26 against accidental movement. The switch is also provided with side lugs 27, and a handle 28, and its movement is limited by the fixed pins 29. Also the front end of the carrier is provided with a pin 30, Fig. 2. In the arrangement shown the switch is arranged below the lower driver 13, Fig. 5, and when in the position shown in Fig. 6 it prevents the automatic transfer action of the carrier and holds such carrier on its own driver until the carrier is under the control of the rim surrounding such driver. The pin 30 then acts upon the lug 27 and turns the switch into position for holding the next carrier on its own driver. If however the switch is moved to the opposite position relatively to the advancing carrier from that shown in Fig. 6, it acts as a guard to carriers automatically transferring themselves from one driver to another and its position is automatically changed by the carriers.

In another arrangement, shown in Fig. 7, the pivotally mounted switch 31 is connected by a cord or other connection 32 to a jacquard or equivalent pattern mechanism and is normally held up to one of the fixed stops 33 by a spring 34. By this arrangement the action of every carrier at the passing places can be controlled and more elaborate patterns can be produced.

In Figs. 6 and 7 the rims, drivers and carriers are shown in dotted lines to indicate their positions relatively to the switch, and there may be a switch for every pair of drivers, provided such switch is positioned as shown relatively to the direction of movement of the drivers. The carriers herein described may also be used in connection with braiding machines having a comparatively large number of drivers arranged in a circle as indicated in Fig. 8. The drivers 35 are geared together to revolve in the directions of the arrows, and are mounted on axles carried by the ring or base plate 36. These drivers are surrounded by the rims 37 by which the carriers 38 are held on to the drivers and such rims are cut away to form carrier passing places 38ª. The machine is preferably fitted with jacquard controlled switches arranged at the points 39, and there may be supplementary drivers or carrier resting places 40 of any suitable size or sizes relatively to the other drivers, used for changing the relative positions of the carriers.

In other modifications the carrier is in the form of a flat spring with holes or pegs for engaging with the driver which is modified accordingly, or the chain carrier is fitted with a catch mechanism for holding the spring in the position to which it is bent by the rims 19 and the carrier remains on its own driver until the spring is released from its catch mechanism. Also, switches operated by a jacquard may be fitted to slide instead of being mounted upon an axle.

In addition to the parts herein described the machine is fitted with work take-up mechanism and other usual and necessary parts of a braiding machine.

I claim.

1. In a braiding machine the combination of two or more toothed drivers, fixed guides which partially surround the drivers and are separated to form carrier passing places between each pair of drivers, chain carriers and springs mounted upon such drivers and adapted to control the action of the carriers at the passing places substantially as herein set forth.

2. In a braiding machine the combination of two or more tooth drivers, fixed guides which partially surround the drivers and are separated to form carrier passing places between each pair of drivers, chain carriers and straight flat springs attached to the carriers and adapted to automatically transfer the carriers from one driver to another at each passing place substantially as herein described.

3. In a braiding machine the combination of upper toothed drivers, lower toothed drivers, fixed guides which partially surround the drivers, an upper chain to the carrier, a lower chain to the carrier, connecting studs between the said carrier chains, and flat springs attached to the carriers substantially as herein set forth.

4. In a braiding machine the combination of a circular ring of toothed drivers, fixed guides which partially surround the drivers and are separated to form carrier passing places between each pair of drivers, auxiliary drivers or carrier resting places, fixed guides partially surrounding the same and formed with passing places between the drivers and the auxiliary drivers and spring carriers adapted to automatically control their action at the passing places substantially as herein set forth.

5. In a braiding machine the combination of upper and lower drivers, axles upon which the drivers are mounted and through which are holes, bearings for the said axles, toothed gear wheels below the bearings and fixed upon the driver axles, fixed guides which partially surround the drivers and are separated to form carrier passing places between each pair of drivers, chain carriers, springs for automatically controlling the action of the carriers at the passing places, and switch mechanism for controlling the automatic transfer action of the carriers substantially as herein set forth.

6. In a braiding machine, a flexible carrier for the spool spindles, and a spring acting upon the carrier for assisting in directing its movements when in operation.

7. In a braiding machine, a flexible carrier comprising a chain supporting a spool spindle, and a flat spring acting on the carrier and tending to maintain it in a certain determined form.

8. In a braiding machine, a flexible carrier consisting of a pair of chains carrying a spool spindle and spacing studs between the chains, and a spring acting upon the carrier and tending to maintain it normally in a determined form.

THOMAS HENRY JONES.

Witnesses:
WILLIAM H. POTTER,
SAMUEL STEVENSON.

Copies of this patent may be obtained for five cents each, by addressing the "Commissioner of Patents Washington, D. C."